(12) United States Patent
Bird et al.

(10) Patent No.: US 7,818,301 B2
(45) Date of Patent: Oct. 19, 2010

(54) METHOD, SYSTEM AND ARTICLE OF MANUFACTURE FOR ROLLING BACK PAST A BOUNDARY GENERATOR TO A SAVEPOINT LOCATED IN A UNIT OF WORK

(75) Inventors: Paul Miller Bird, Markham (CA); Yuk Kuen Chan, Markham (CA); Yin Ling Cheung, Markham (CA)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 11/016,061

(22) Filed: Dec. 17, 2004

(65) Prior Publication Data

US 2006/0136505 A1    Jun. 22, 2006

(51) Int. Cl.
    G06F 17/30    (2006.01)
(52) U.S. Cl. .................. 707/674; 707/684
(58) Field of Classification Search .......... 707/3, 707/204, 674, 684
    See application file for complete search history.

(56) References Cited

U.S. PATENT DOCUMENTS

| | | | |
|---|---|---|---|
| 4,498,145 A | 2/1985 | Baker et al. ................. 364/900 |
| 6,047,285 A | 4/2000 | Jacobs et al. ................. 707/4 |
| 6,105,025 A | 8/2000 | Jacobs et al. ................. 707/8 |
| 6,185,577 B1 * | 2/2001 | Nainani et al. ............. 707/202 |
| 6,301,677 B1 * | 10/2001 | Squibb ...................... 714/13 |
| 6,341,302 B1 * | 1/2002 | Celis ......................... 718/100 |
| 6,490,610 B1 | 12/2002 | Rizvi et al. ................ 709/101 |
| 6,539,402 B1 * | 3/2003 | Sorenson et al. .......... 707/202 |
| 6,615,214 B1 | 9/2003 | Bird et al. ................. 707/100 |
| 7,103,597 B2 * | 9/2006 | McGoveran ................ 707/8 |
| 2002/0174108 A1 | 11/2002 | Cotner et al. ................ 707/3 |
| 2003/0040347 A1 | 2/2003 | Roach et al. ................. 463/1 |
| 2003/0101434 A1 * | 5/2003 | Szyperski ................. 717/120 |
| 2003/0208464 A1 * | 11/2003 | Lee et al. ................... 707/1 |
| 2005/0091187 A1 * | 4/2005 | Madhavarapu et al. ....... 707/1 |

* cited by examiner

*Primary Examiner*—John E Breene
*Assistant Examiner*—Thu-Nguyet Le
(74) *Attorney, Agent, or Firm*—Sughrue Mion, PLLC

(57) ABSTRACT

Disclosed is a data processing system-implemented method, a data processing system and an article for manufacture for directing a data processing system to roll back to a savepoint located in a unit of work having a boundary generated by a boundary generator. The data processing system-implemented method includes examining a savepoint status indicator associated with the savepoint, and rolling back past the boundary to the savepoint depending on whether the examined savepoint status indicator indicates rolling back past the boundary towards the savepoint is permitted.

26 Claims, 20 Drawing Sheets

EXAMPLES OF BOUNDARY GENERATORS 302

| 402A SAVEPOINT IDENTIFIER | 402B SAVEPOINT STATUS INDICATORS ASSOCIATED WITH THE IDENTIFIED SAVEPOINT | |
|---|---|---|
| 404 SAVEPOINT ASSOCIATED WITH W-TYPE BOUNDARY GENERATOR | B1=0 | 408 W-TYPE BOUNDARY DOES NOT EXIST IN UNIT OF WORK |
| | B1=1 | 410 W-TYPE BOUNDARY EXISTS IN UNIT OF WORK |
| 406 SAVEPOINT ASSOCIATED WITH X-TYPE OR Y-TYPE BOUNDARY GENERATOR | B2=0 | 412 NEITHER X-TYPE NOR Y-TYPE BOUNDARY GENERATOR EXISTS IN UNIT OF WORK |
| | B2=1 | 414 EITHER X-TYPE OR Y-TYPE BOUNDARY GENERATOR EXISTS IN UNIT OF WORK |
| | BOUNDARY COUNTER | 416 NUMBER OF X-TYPE OR Y-TYPE BOUNDARY GENERATORS EXISTING IN UNIT OF WORK |
| 407 SAVEPOINT ASSOCIATED WITH Z-TYPE BOUNDARY GENERATOR | NO INDICATORS ASSIGNED | 417 DO NOT CHANGE ANY INDICATORS |

FIG. 4 table 502
savepoint status indicator
manipulation rules

| 502A<br>BOUNDARY<br>GENERATOR TYPE | 502B<br>MANIPULATION RULES FOR MANIPULATING SAVEPOINT STATUS INDICATORS ASSOCIATED WITH A SAVEPOINT. THE RULES ASSOCIATED WITH A TYPE OF BOUNDARY GENERATOR |
|---|---|
| 504<br>W-TYPE | INSERT INDICATOR INDICATING A W-TYPE BOUNDARY GENERATING ROUTINE INTO SAVEPOINT QUEUE, AND SET B1=1 |
| 506<br>X-TYPE | FOR NEWEST ENTRY IN SAVE POINT QUEUE, SET B2=1, AND INCREMENT BOUNDARY COUNTER (+1) |
| 508<br>Y-TYPE | FOR NEWEST ENTRY IN SAVE POINT QUEUE, SET B2=1, AND INCREMENT BOUNDARY COUNTER (+1) |
| 510<br>Z-TYPE | DO NOTHING TO ANY SAVEPOINT STATUS INDICATORS |

FIG. 5

502
savepoint status
indicator manipulation
rules

QUEUE STATE 212 OF FIGURE 2

QUEUE STATE 214 OF FIGURE 2

QUEUE STATE 216 OF FIGURE 2

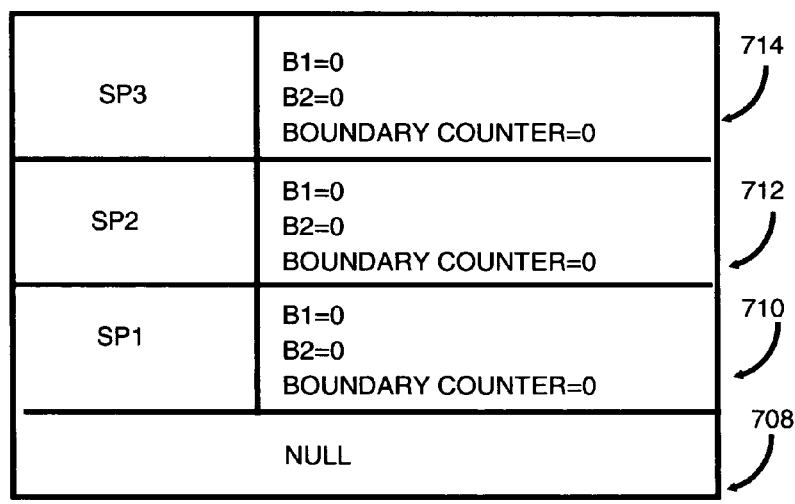
QUEUE STATE 218 OF FIGURE 2
FIG. 7D

QUEUE STATE 220 OF FIGURE 2

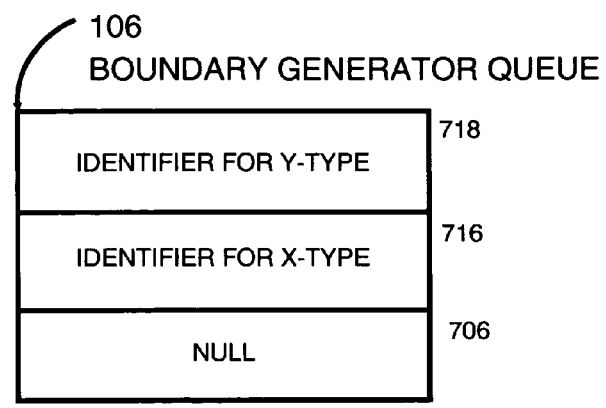
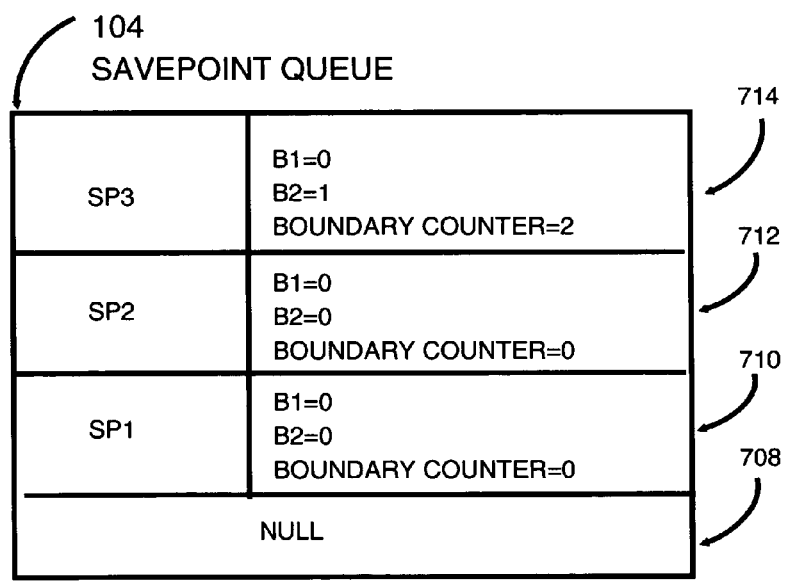
QUEUE STATE 222 OF FIGURE 2
FIG. 7F

QUEUE STATE 224 OF FIGURE 2

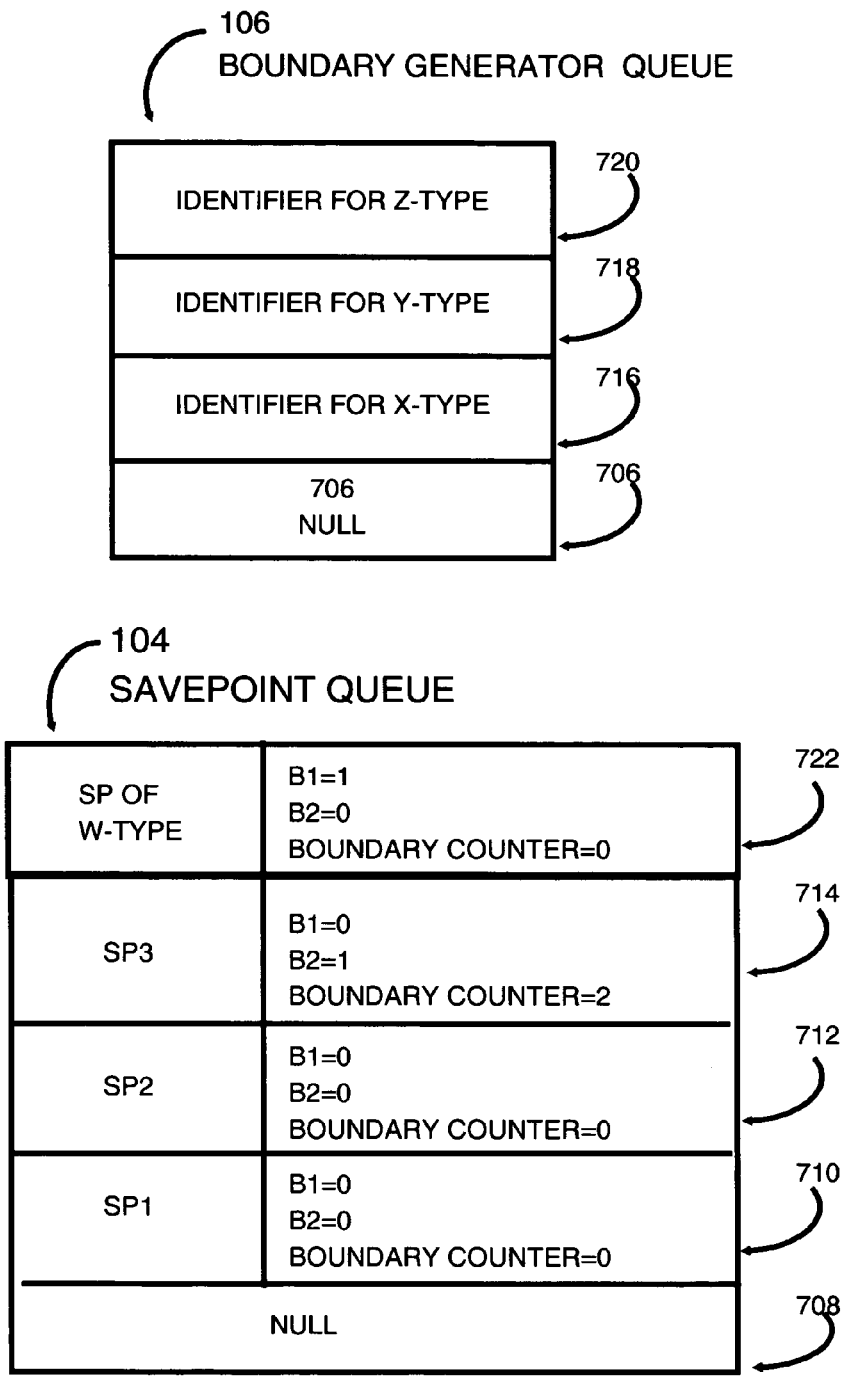
FIG. 7H  QUEUE STATE 226 OF FIGURE 2

ROLLING BACK OPERATION S800
OF DBTM 100 OF FIGURE 1

EXAMINATION OF SAVEPOINT STATUS INDICATORS
OPERATION S900 OF DBTM 100 OF FIGURE 1

ROLLING BACK OPERATION S1000 OF DBTM 100 OF FIGURE 1

METHOD, SYSTEM AND ARTICLE OF MANUFACTURE FOR ROLLING BACK PAST A BOUNDARY GENERATOR TO A SAVEPOINT LOCATED IN A UNIT OF WORK

FIELD OF THE INVENTION

The present invention pertains to database transaction managers (DBTM), and more particularly to a data processing system-implemented method, a data processing system and an article of manufacture for rolling back past a boundary generator to a savepoint located in a unit of work.

BACKGROUND

A unit of work (UW) contains database statements. The UW is to be executed by a Database Management System (DBMS) against a database (DB), and upon execution of the UW, changes may be made to the contents of the DB.

Some DBMSs may include a database transaction manager (DBTM). The DBTM may be used to process the UW before that UW is passed onto the DBMS. Examples of DBTM commands are the BEGIN statement, the COMMIT statement and the ROLLBACK statement. The BEGIN statement notifies the DBTM that the UW will begin with a DB statement which immediately follows the BEGIN statement. The COMMIT statement directs the DBTM to pass on all database statements contained in the UW to the DBMS so that the DBMS may then execute the database statements contained in the UW. The ROLLBACK statement directs the DBTM to remove some or all of the database statements contained in the UW before the UW may then be COMMITTED (by use of the COMMIT statement). The DBTM may store the collection of database statements of the UW in a transaction log file (for example, a buffer). The ROLLBACK statement directs the DBTM to edit the UW, and then the COMMIT statement may be used to direct the DBTM to forward the edited WU over to the DBMS for subsequent execution against the DB.

The DBTM may be non-integrated with the DBMS or the DBTM may be integrated with the DBMS. The ROLLBACK statement may be embedded in an application program or it may be issued through the use of dynamic SQL statements as known in the art (that is, it may be an executable statement that may be dynamically prepared). The ROLLBACK statement may direct the DBMS to back out of database statements included in the UW (thereby effectively removing rolled back database statements to a preferred point or location in the UW.

Another DBTM statement is a SAVEPOINT statement which directs the DBTM to insert a savepoint within the UW. The savepoint statement may be included in an application program (including a stored procedure) or may be issued interactively to the DBTM (as known in the art). The savepoint statement may also be an executable statement that may be dynamically prepared. The savepoint which becomes inserted into the UW becomes a marker within the UW. This is for the convenience of the user so that any database statements inserted after the savepoint may be rolled back to the savepoint if and when it is deemed necessary to do so by the user.

Some ROLLBACK statements may be used to direct the DBTM to roll back database statements made after the savepoint. Executing this type of ROLLBACK statement may result in a partial rollback (that is, roll back to a savepoint) of the database statements contained in the UW.

A problem exists when boundary generators are inserted into the UW between a savepoint and the ROLLBACK statement which directs the DBTM to roll back past the boundary generator to the savepoint. Some types of boundary generators may not be rolled past and some other types of may be rolled past. Executing the "partial" ROLLBACK statement in the presence of a boundary generator that does not permit any rolling back past the boundary generator may lead to unpredictable results or errors in the UW, which in turn when the UW is executed against the DB, the DB may become disadvantageously ruined altogether.

What is needed is a solution to the above described problem.

SUMMARY

It is an object of the invention to mitigate the drawbacks identified above.

In a first aspect of the invention, there is provided a data processing-system implemented method for directing a data processing system to roll-back to a savepoint, having an associated savepoint status indicator, located in a unit of work having a boundary generated by a boundary generator, the data processing system-implemented method comprising the steps of: examining the savepoint status indicator; and rolling-back past the boundary to the savepoint responsive to the examined savepoint status indicator indicating rolling-back past the boundary towards the savepoint is permitted.

In a second aspect of the invention, there is provided an article of manufacture for directing a data processing system to roll-back to a savepoint, having an associated savepoint status indicator, located in a unit of work having a boundary generated by a boundary generator, the article of manufacture comprising: a data processing system usable medium tangibly embodying one or more instructions executable by the data processing system, the one or more instructions comprising: data processing system executable instructions for examining the savepoint status indicator; and data processing system executable instructions for rolling-back past the boundary to the savepoint responsive to the examined savepoint status indicator indicating rolling-back past the boundary towards the savepoint is permitted.

In a third aspect of the invention, there is provided a data processing system for rolling-back to a savepoint, having an associated savepoint status indicator, located in a unit of work having a boundary generated by a boundary generator, the data processing system comprising: an examination module for examining the savepoint status indicator; and a rolling-back module for rolling-back past the boundary to the savepoint responsive to the examined savepoint status indicator indicating rolling-back past the boundary towards the savepoint is permitted.

BRIEF DESCRIPTION OF THE DRAWINGS

A better understanding of these and other embodiments of the present invention can be obtained with reference to the following drawings and detailed description of the preferred embodiments, in which:

FIG. 4 shows the savepoint queue used by the data processing system of FIG. 1;

FIG. 5 shows savepoint status indicator manipulation rules associated with the savepoints of FIG. 1;

FIGS. 7A, 7B, 7C, 7D, 7E, 7F, 7G and 7H shows queue states of the savepoint queue and the boundary generators of FIG. 2;

Similar references are used in different figures to denote similar components.

DETAILED DESCRIPTION

Figure 1A:
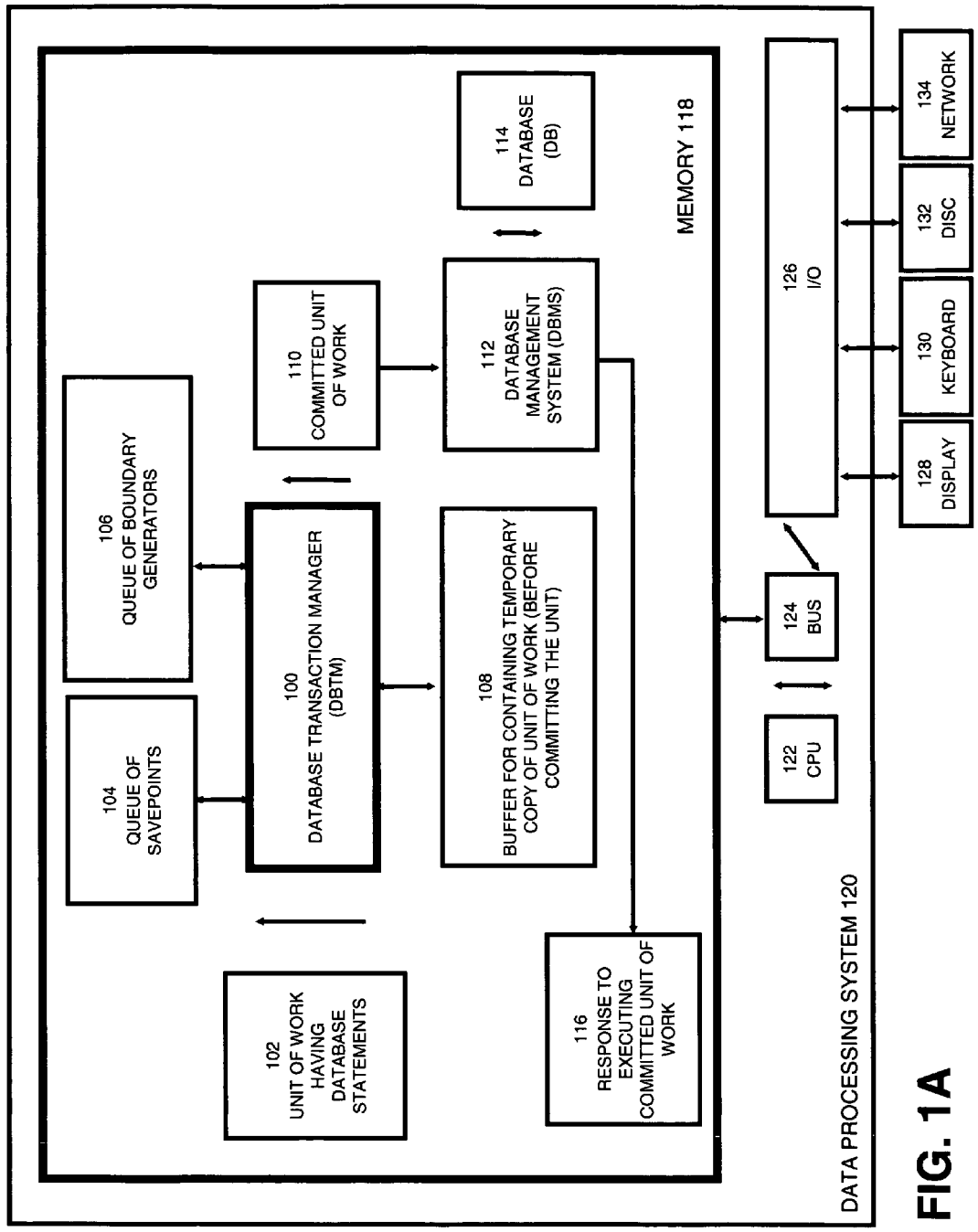
FIGS. 1A and 1B are schematic representations of an exemplary embodiment of a data processing system, according to the present invention, for rolling back to a savepoint located in a unit of work having a boundary generator.

FIG. 1A is a schematic representation of an exemplary embodiment of a data processing system (DPS) 120 according to the present invention for rolling back past a boundary generator (BG) to a savepoint, the savepoint and the BG being located in a UW. The DPS 120 includes a Database Transaction Manager (DBTM) 100 which is stored in a memory 118 of the DPS 120. Also stored in the memory 118 is an operating system 119 (operating systems are well known in the art). The DPS 120 includes a bus 124 operatively coupled to the memory 118 and also operatively coupled to a Central Processing Unit (CPU) 122 and an input/output interface unit (I/O Unit) 126. Also stored in memory 118 is a UW 102.

The UW 102 includes a plurality of database statements. The DBTM 100 processes the UW 102 and can create a buffer 108 for containing a copy of the UW 102. A user can direct the DBTM 100 to add database statements to the UW 102 or to remove database statements from the UW 102. The DBTM 100 interacts with the user and manages the database statements contained in the UW 102.

Also stored in the memory 118 is a queue of savepoints (that is, a savepoint queue) 104 and a queue of boundary generators (that is, a boundary generator queue) 106. The DBTM 100 may refer to the queue 104 and the queue 106 while processing the UW 102. For the purpose of illustrating the embodiments, a DBMS 112 is shown stored in the memory 118. The DBMS 112 may alternatively be stored in memory of another DPS (not illustrated) that is then network connected to the DPS 120. The DBMS 112 executes the committed (i.e. processed) UW 102 against a database 114. The DBMS 112 compiles a response to the executed UW 102 and provides an output which is indicated as the DBMS response 116.

Figure 1B:
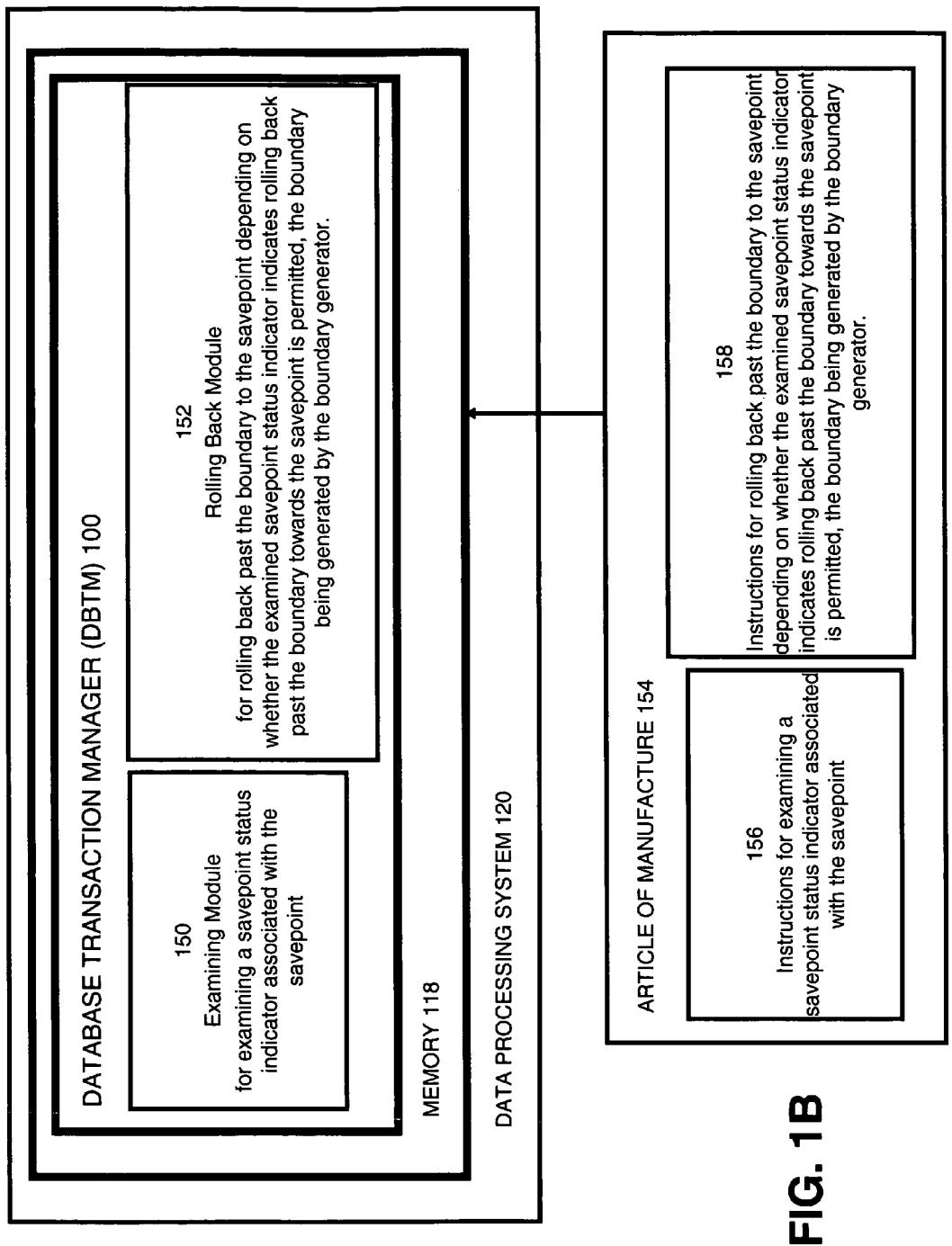

FIG. 1B is a schematic representation of an exemplary embodiment according to the present invention of DPS 120 having an examining module 150 for examining a savepoint status indicator associated with a savepoint, and a rolling back module 152 for rolling back past a boundary to the savepoint responsive to whether the examined savepoint status indicator indicates rolling back past the boundary towards the savepoint is permitted, the boundary being generated by a boundary generator.

Also shown, in an exemplary embodiment, is an article of manufacture 154 for directing the DPS 120. The article of manufacture 154 includes a data processing system usable medium tangibly embodying one or more instructions executable by the DPS 120. The medium may be a data processing system-usable storage medium or it may be a network signal bearing the instructions. The instructions (also known as code) include data processing system executable instructions 156 for examining a savepoint status indicator associated with the savepoint, and data processing system executable instructions 158 for rolling back past the boundary to the savepoint depending on whether the examined savepoint status indicator indicates rolling back past the boundary towards the savepoint is permitted, the boundary being generated by the boundary generator.

The DBTM 100 may include the data processing system executable instructions 156 and 158 which can be complied from computer programmed instructions written in a high level computer programming language. The I/O Unit 126 may be used to operatively connect the article of manufacture 154 to the DPS 120.

Figure 2:
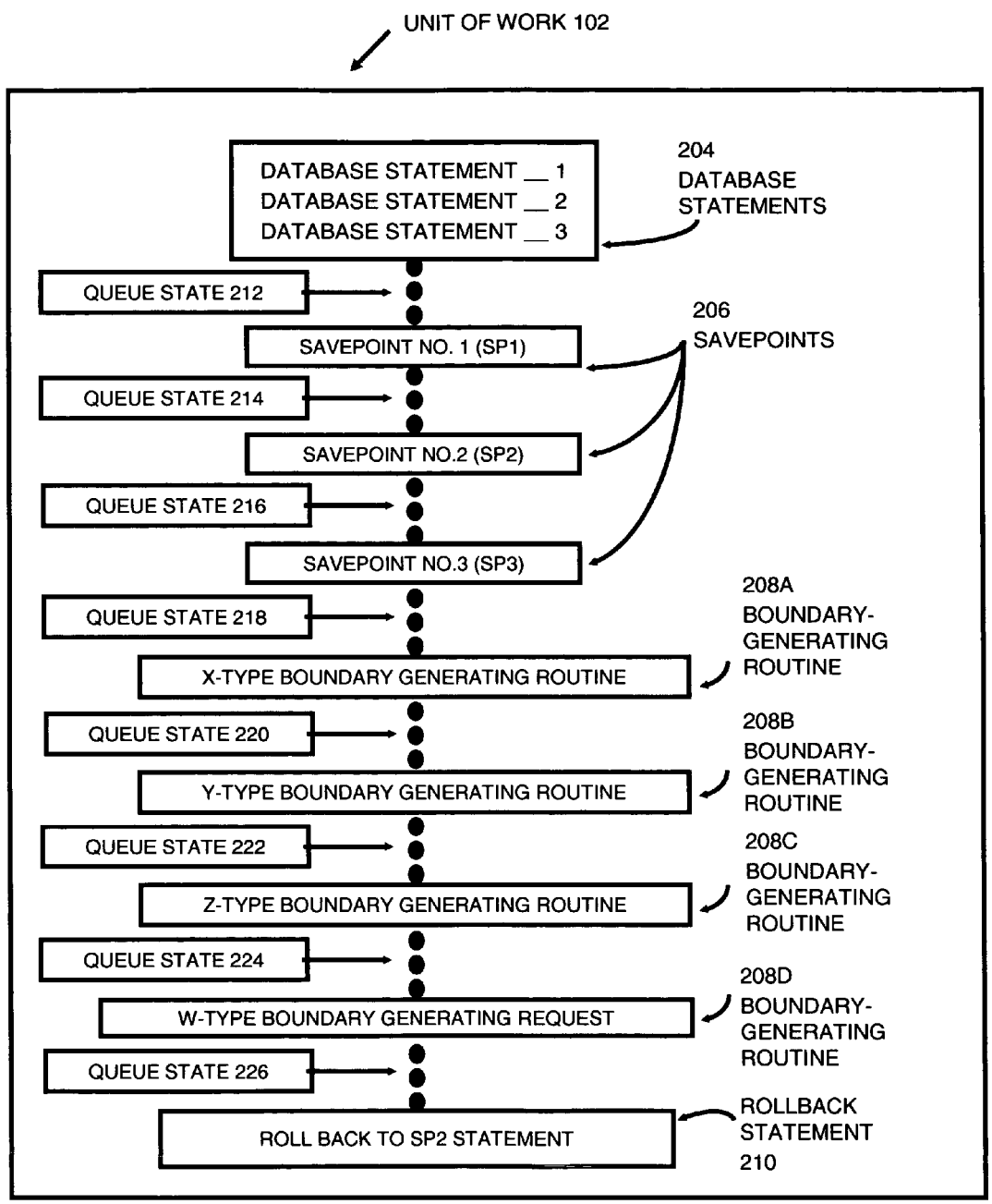
FIG. 2 is a schematic representation of the unit of work of FIG. 1.

FIG. 2 is a schematic representation of the UW 102 of FIG. 1 that can be placed in the buffer 108. The UW 102 contains a collection of database statements. The UW 102 contains a first database statement and a second database statement and so on to a first savepoint (i.e., SP1) and additional database statements leading to a second savepoint (that is, SP2). SP2 is followed by other database statements (indicate as three dots in FIG. 2) followed by a third savepoint (i.e., SP3) again followed by more database statements. Then there is an X-type boundary generating routine placed in the UW 102. After that, follow more database statements and then there is a Y-type boundary generating routine. More database statements lead to a Z-type boundary generating routine. More database statements lead to a W-type boundary generating request. More database statements are shown included in the UW 102 followed by a ROLLBACK statement 210 also included in the UW102. The ROLLBACK statement 210 directs the DBTM 100 of FIG. 1 to roll back to SP2. However, executing the ROLLBACK statement 102 may result in errors if no action is executed to examine the boundary generators installed in the UW 102. There are four boundary generators shown in the UW 102, each representing a different exemplary type of boundary generator. The DBTM 100 ascertains whether rolling back past these boundary generators may take place all the way back to savepoint 2 depending on the current state or status of savepoint status indicators. The savepoint status indicators may be placed in the savepoint queue 104 which will be further explained below.

Figure 3:
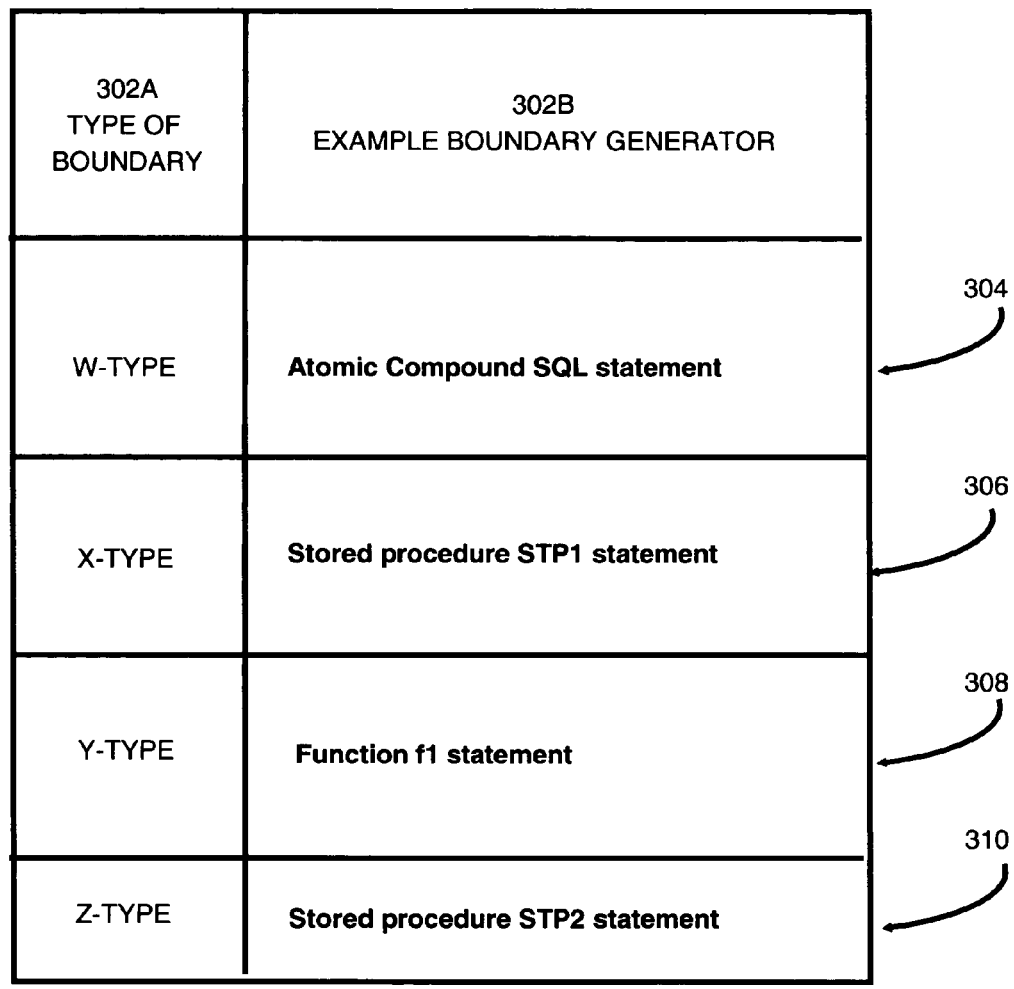
FIG. 3 shows examples of boundary generators installed in the unit of work of FIG. 2.

FIG. 3 shows types of boundaries 302A for examples of boundary generators 302B included in the UW 102 of FIG. 2. Row 304 shows a W-type boundary generating request. Row 306 shows an X-type boundary generating routine. Row 308 shows a Y-type boundary generating routine. Row 310 shows a Z-type boundary generating routine. Four types of boundary generators are described. The illustrated embodiment includes these four types of boundary generators. It will be appreciated that an alternative embodiment may be adapted for use with other types of boundary generators by adapting the savepoint status indicators (maybe adding new savepoint status indicators) and adapting savepoint status indicator manipulation rules.

A first example of a boundary generator is a W-type boundary generating request which is a collection of statements. The request causes a boundary to be generated and inserted into the UW 102. The W-type boundary generating request is not a routine. Once the boundary generating request is executed, a boundary becomes set in UW 102. An example of a W-type boundary generator is an Atomic Compound SQL statement. The form of the Atomic Compound SQL Statement is:

EXEC SQL BEGIN COMPOUND ATOMIC STATIC
CREATE TABLE T1 (C1 int);
END COMPOUND;

A second example of a boundary generator is an X-type boundary generating routine. An example of the X-type boundary generating routine is a stored procedure STP1 statement. The form of a stored procedure STP1 statement is:

create procedure stp1( )
new savepoint level
begin end

This boundary generator may be executed as follows::
   call stp1( )

A third example of a boundary generator is a Y-type boundary generating routine. An example of the Y-type boundary generating routine is a function f1 statement. The form of this routine is:
   CREATE FUNCTION f1( )
   RETURNS
   INTEGER
   EXTERNAL NAME 'f1!f1'
   PARAMETER STYLE SQL
   LANGUAGE C
   NO EXTERNAL ACTION The function f1( ) may look like this:

```
void SQL_API_FN f1( )
{
/* statements.... */
return
}
```

This type of boundary generator may be compiled and linked using an export file. This boundary generator may be executed as follows:
   values f1( )

A fourth type of boundary generator is a Z-type boundary generating routine. An example of the Z-type boundary generating routine is a stored procedure STP2 statement. The form of the stored procedure STP2 statement is:
   create procedure stp2( )
   old savepoint level
   begin end This boundary generator may be executed as follows:
   call stp2( )

FIG. 4 shows the savepoint queue 104 of FIG. 1. Column 402A shows a savepoint identifier which indicates a savepoint inserted into the UW 102. Column 402B contains savepoint status indicators associated with the identified savepoint.

Row 404 shows the savepoint associated with the W-type boundary generator. For this type of savepoint, one indicator can be manipulated. Row 408 shows an indicator B1 which can be associated with this type of savepoint. Row 408 shows B1=0 which indicates that the W-type boundary does not exist in the UW 102. Row 410 shows B1=1 which indicates that the W-type boundary does exist in the UW 102.

Row 406 shows a savepoint associated with either the X-type of the Y-type boundary generator. Savepoint status indicators associated with this type of savepoint is shown in rows 412, 414, and 416. Row 412 shows B2=0 which indicates neither an X-type or Y-type boundary generator exists in the UW 102. Row 414 shows B2=1 which indicates that either an X-type or a Y-type boundary generator exists in the UW 102. Row 416 shows a boundary counter which may indicate a number of X-type or Y-type boundary generators present in the UW 102.

Row 407 shows a savepoint associated with the Z-type boundary generator. For this type of boundary generator, no savepoint indicators are assigned (and B1 and B2 indicators are not affected by this type of boundary generator).

FIG. 5 shows savepoint status indicator manipulation rules associated with the types of boundary generators contained in the boundary generating queue 106 of FIG. 1. Table 502 shows column 502A which indicates a boundary generator type, and column 502B which indicates the savepoint status indicator manipulation rules for changing the savepoint status indicators.

Row 504 shows the rule (this rule is associated with the W-type boundary generator) which directs the DBTM 100 to insert a savepoint identifier into the savepoint queue 104 and then set B1=1.

Rows 506 and 508 show rules associated with the X-type or the Y-type boundary generator. These rules direct the DBTM 100 to seek a top entry in the savepoint queue 104 and set B2=1 and increment a boundary counter (BC) by one (the B2 indicator and the BC are associated with the top entry in the savepoint queue 104).

Row 510 shows rules associated with the Z-type boundary generator in which this rule directs the DBTM 100 to make no changes to any savepoint status indicators contained in the savepoint queue 104.

Figure 6:
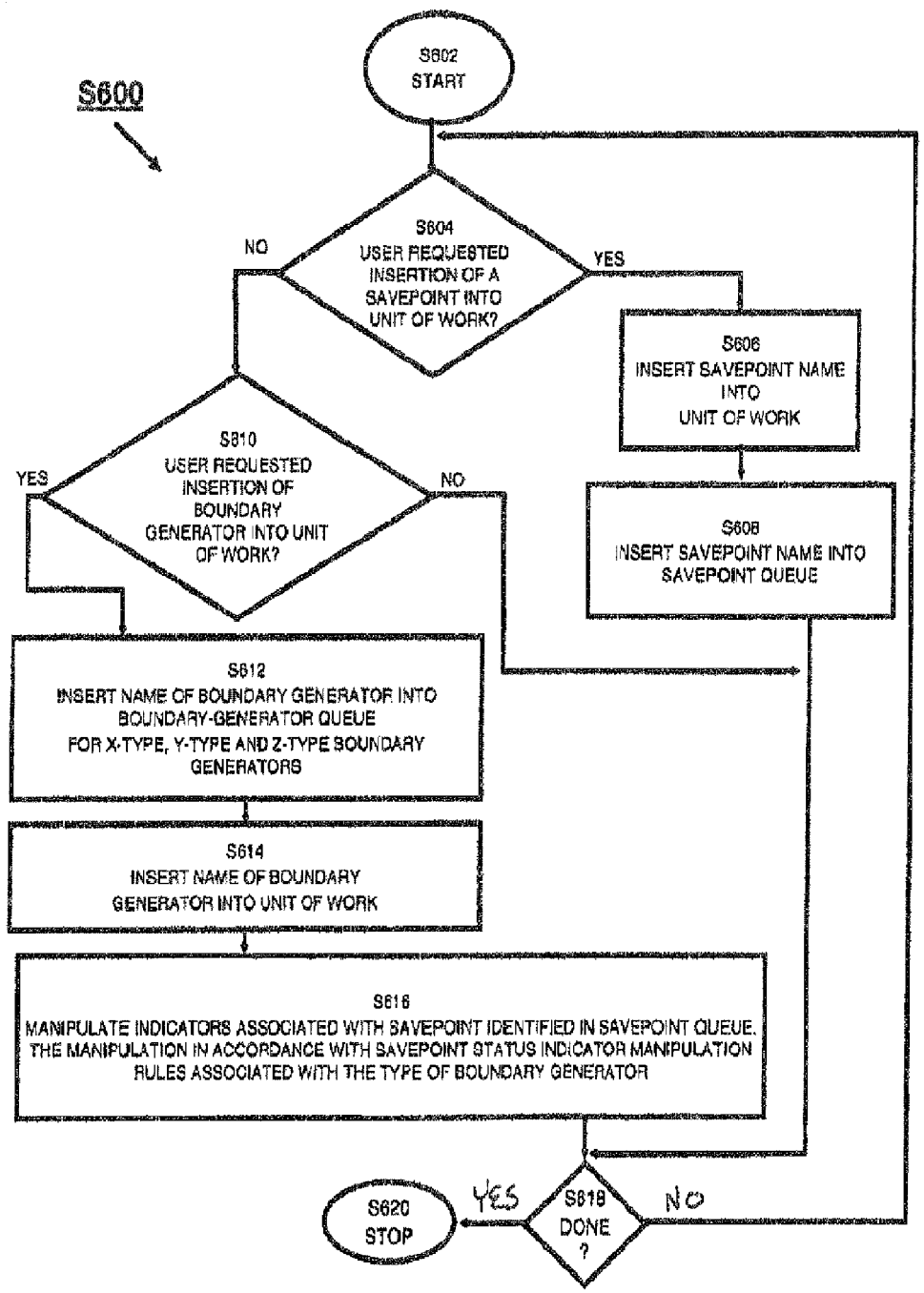
FIG. 6 shows a savepoint indicator manipulation operation performed by the data processing system of FIG. 1.

FIG. 6 shows a savepoint status indicator manipulation operation S600 of the DBTM 100 of FIG. 1.

Operation S602 directs the DBTM 100 to begin the operation S600.

Operation S604 directs the DBTM 100 to ascertain whether the user (i.e., the user manipulating the UW 102) requested insertion of a savepoint into the UW 102. If no such user request was received by the DBTM 100, control may be transferred to operation S610. If a user request was received, control may then be transferred to operation S606.

Operation S606 directs the DBTM 100 to insert a name or an identifier of the savepoint into the UW 102.

Operation S608 directs the DBTM 100 to insert the name (i.e., an identifier) of the savepoint into the savepoint queue 104.

Operation S618 directs the DBTM 100 to ascertain whether the user has any further commands or directions for the DBTM 100. If more user requests are to be processed, control is transferred back to operation to operation S604. If there are no more user requests, control may then be transferred to operation S620 in which case the DBTM 100 may stop operation S600.

In the case where the user requested no insertion of a savepoint into the UW 102, operation S610 directs the DBTM 100 to ascertain or determine whether the user requested an insertion of a boundary generator into the UW 102. If no boundary generator was requested for insertion, control may be transferred to operation S618. If the DBTM ascertains that the user did request insertion of the boundary generator into the UW 102, control may then be transferred to operation S612.

Operation S612 directs the DBTM 100 to insert the name (i.e., an identifier) of the boundary generator into the boundary generator queue 106 for X-type, Y-type and Z-type boundary generators.

Operation S614 directs the DBTM 100 to insert the boundary generator into the UW 102.

Operation S616 directs the DBTM 100 to manipulate savepoint status indicators associated with a savepoint identified in the savepoint queue 104 according to savepoint status manipulation rules associated with a type of boundary generators found or inserted into the UW 102.

Operation S618 directs the DBTM 100 to determine whether to transfer control back to operation S604 or to stop operation S600 altogether.

FIGS. 7A, 7B, 7C, 7D, 7E, 7F, 7G and 7H show queue states of the savepoint queue 104 and the boundary generator queue 106 of FIG. 1.

Figure 7A:
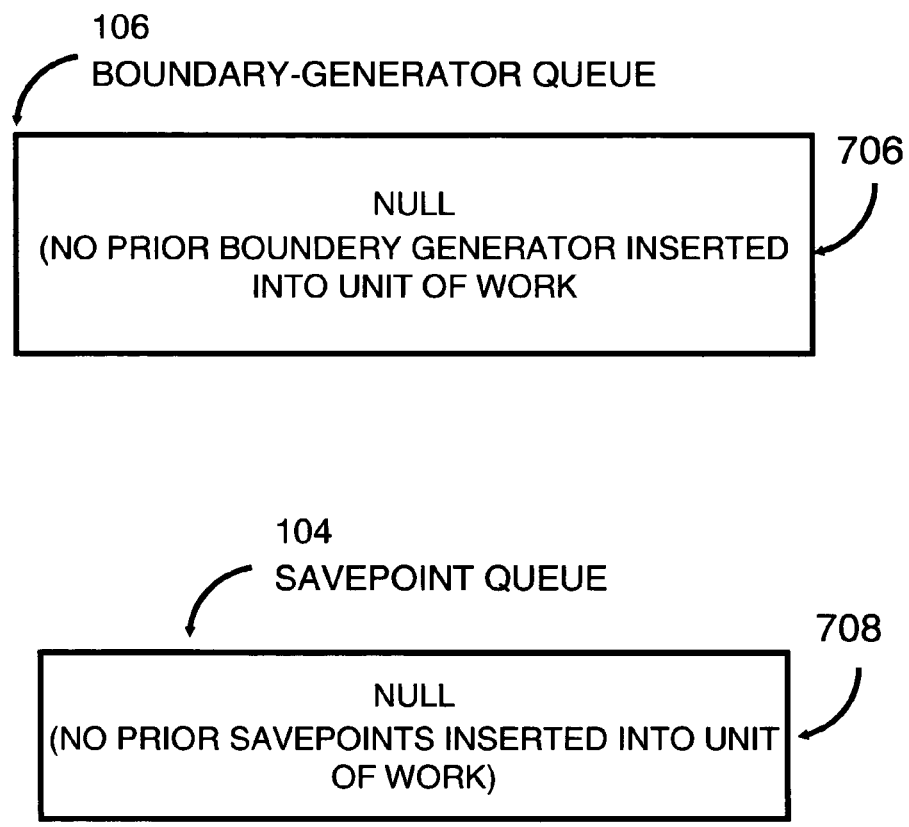

FIG. 7A shows the states of the queues 104 and 106 at queue state 212 of FIG. 2. Both queues 104 and 106 show null values. This means that the DBTM 100 (at a point in time when the queue states were current) has not been asked to process the contents of the queues 104 and 106.

Figure 7B:
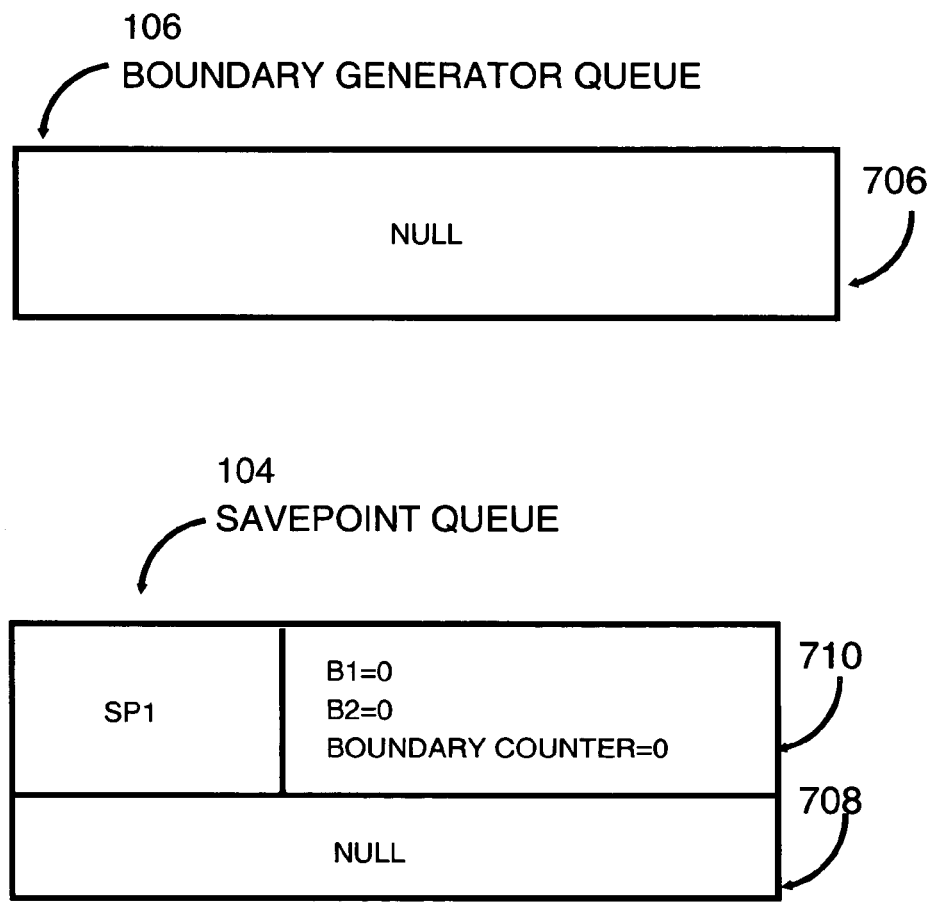

FIG. 7B shows queue states of the queues 104 and 106 at queue state 214 of FIG. 2. The boundary generator queue 106 indicates a NULL value because no type of boundary generator has been yet processed by the DBTM 100. Savepoint queue 104 shows that there has been one savepoint (i.e., SP1) that has been processed by the DBTM 100. Looking at the savepoint status indicators associated with SP1, the indicator B2 and the boundary counter have both been set to zero because the DBTM 100 has not detected any boundary generators at this point in time when the queue state 214 was the current state.

Figure 7C:
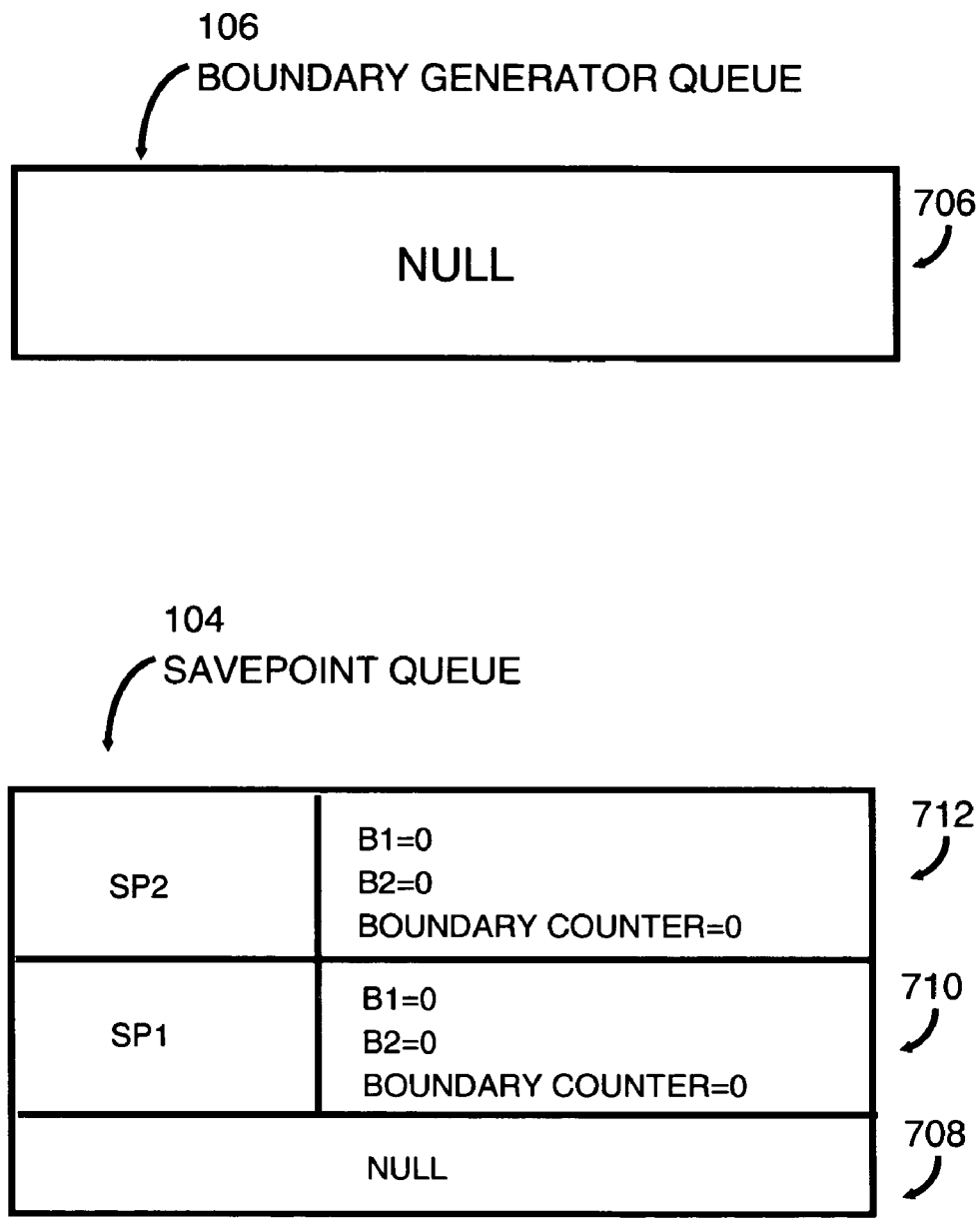

FIG. 7C shows queue states of the queues 104 and 106 at queue sate 216 of FIG. 2. Row 706 shows a NULL value which means the DBTM 100 has not processed any boundary generators at this point in time. Queue 102 indicates that two savepoints (SP1 and SP2) have been processed by the DBTM 100. The savepoint status indicators associated with each of these savepoints have a current value of zero because the DBTM 100 has not processed any boundary generators at this point (i.e. when the queue state 216 is the current queue state).

FIG. 7D indicates queue states of the queues 104 and 106 at queue state 218 of FIG. 2. Queue 106 shows a NULL value. The queue 104 shows three savepoints (SP1, SP2 and SP3), and the savepoint status indicators associated with each savepoint are all set to zero because no boundary generators have been processed by the DBTM 100 at this point in time (i.e. when the queue state 218 is the current state.)

The last entry in the queue 104 shows a NULL value and the reason for this is to indicate that there are no prior savepoints. This is a convenient error checking mechanism so that if there are no savepoints stored in the UW 102 and the user then attempts to direct the DBTM 100 roll back to a savepoint which does not exist in the UW 102, the DBTM 100 may issue an error message (which can state that there are no savepoints to roll back thereto).

Figure 7E:
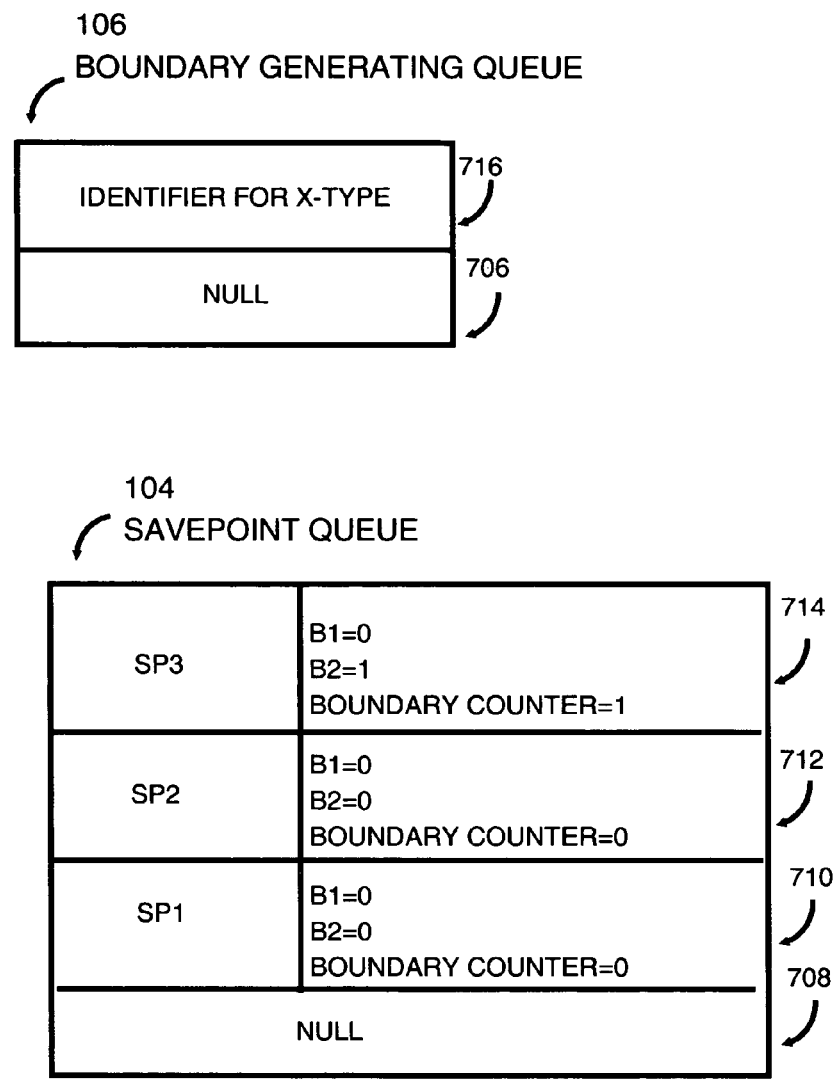

FIG. 7E shows queue states of the queues 104 and 106 at a queue state 220 of FIG. 2. The queue 106 shows that an X-type boundary has been inserted into the UW 102. As a result of doing that, the DBTM 100 has looked up the most recent entry into the savepoint queue 104 and has identified SP3 (as the most relevant savepoint entry in the savepoint queue 104) and has set the savepoint status indicators associated with this savepoint entry by following the savepoint status indicator manipulation rules and as a result the DBTM 100 has set the indicator B2=1 and has set the boundary counter=1. The other indicators associated with SP2 and SP1 have not been manipulated.

FIG. 7F shows queue states of the queues 104 and 106 at queue state 222 of FIG. 2. At this point in time the DBTM 100 has detected that the user has inserted a Y-type boundary generator (into the UW 102) and has now upon detecting that boundary generator, the DBTM 100 updated the most recent entry (the relevant entry) in the savepoint queue 104. By way of example, the queue 106 may be used to detect insertion of the boundary generator. The most recent entry is SP3 which now shows its savepoint status indicators set to B2=1 and the boundary counter has been incremented so that the boundary counter=2 at this point in time when the queue state 222 is the current state.

Figure 7G:
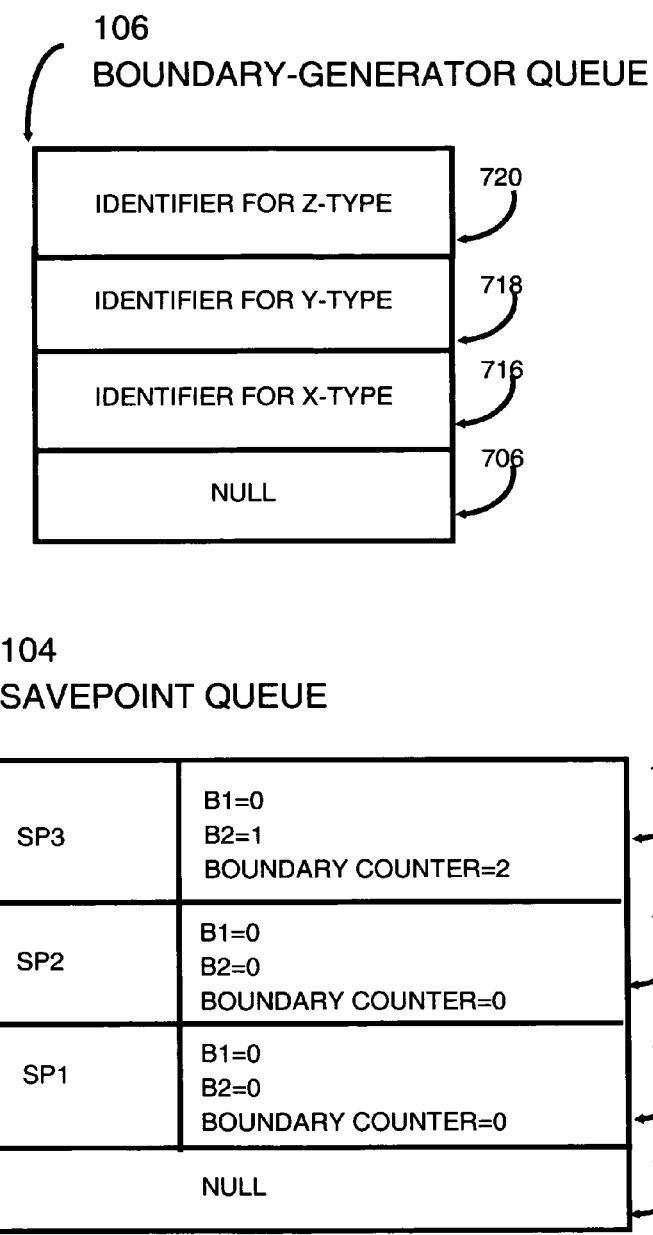

FIG. 7G shows queue states of the queues 104 and 106 for a queue state 224 of FIG. 2. The queue 106 shows a Z-type boundary was inserted in the UW 102. In response to detecting that type of boundary generator, the DBTM 100 makes no changes to the savepoint status indicators for any entries on the savepoint queue 104.

FIG. 7H shows queue state of the queue 104 and 106 at a queue state 226 of FIG. 2 where a W-type boundary generating request has been inserted in the UW 102. The DBTM 100 then responds to this user action by inserting, into the savepoint queue 104, a new entry called the "SP of the W-type boundary generator" which may be is a pointer for pointing back to the W-type boundary generator that was inserted into the UW 102. The DBTM 100 sets the savepoint status indicator (associated with this most recent entry in the queue 104) B1=1. The remaining indicators of the other set point indicators are not changed. All these changes are according to the savepoint status indicator manipulation rules.

It will be appreciated that for row 710, 712 and 714, indicators B1 need not be shown but was shown for convenience. Also, for row 722, indicators B2 and boundary counter do not have to be shown (but were shown for convenience of illustrating the embodiment).

Figure 8:
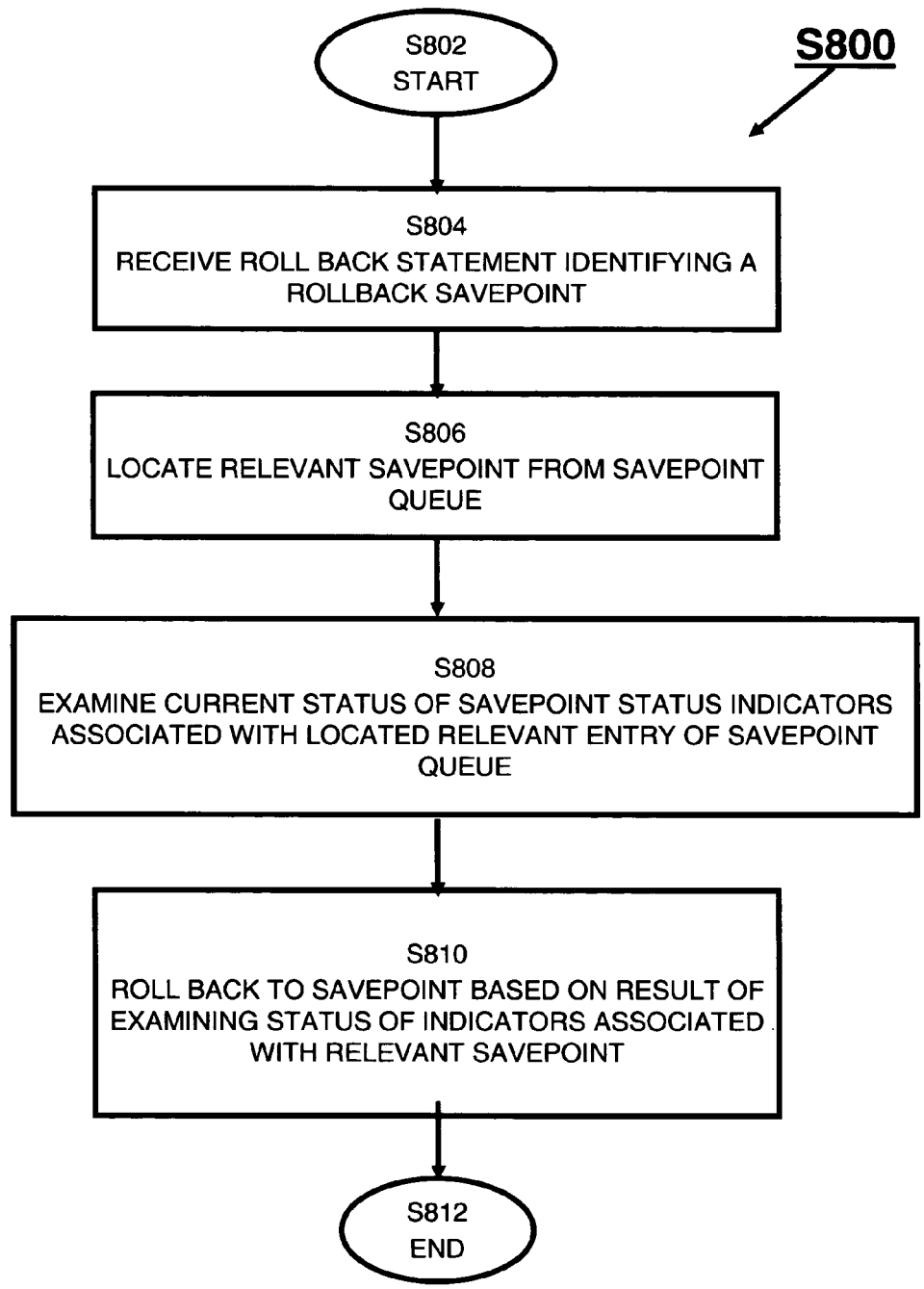
FIG. 8 shows rollback to savepoint operation of the DBTM of FIG. 1.

FIG. 8 shows a rollback to savepoint operation S800 of the DBTM 100 of FIG. 1.

Operation S802 directs the DBTM 100 to begin operation S800.

Operation S804 directs the DBTM 100 to receive a ROLLBACK statement identifying a rollback savepoint (that is, a savepoint to roll back thereto).

Operation S806 directs the DBTM 100 to locate a relevant savepoint entry from the savepoint queue 104. For example, in this embodiment, the relevant savepoint entry is the most recent entry of the savepoint queue 104. For the sake of a convenient explanation of the embodiment, a LIFO (Last in First out) schema was used. It will be appreciated that other types of queue schemes may be adapted for use with an alternative embodiment as is well within the skill of those having ordinary skill in the art to make this adaptation. In fact, the queues 104 and 106 may be adapted or exchanged with other known programming approaches that are known and well within the skill of those skilled in the art.

Operation S808 directs the DBTM 100 to examine the current status of the savepoint status indicators associated with the located relevant savepoint entry in the savepoint queue 104. For example, the most relevant entry may be the recent entry of the savepoint queue 104.

Operation S810 directs the DBTM 100 to roll back to the savepoint identified in the roll back statement based on a result of examining the savepoint status indicators associated with the located relevant savepoint entry of the savepoint queue 104.

Operation S812 directs the DBTM 100 to end the operation S800.

Figure 9A:
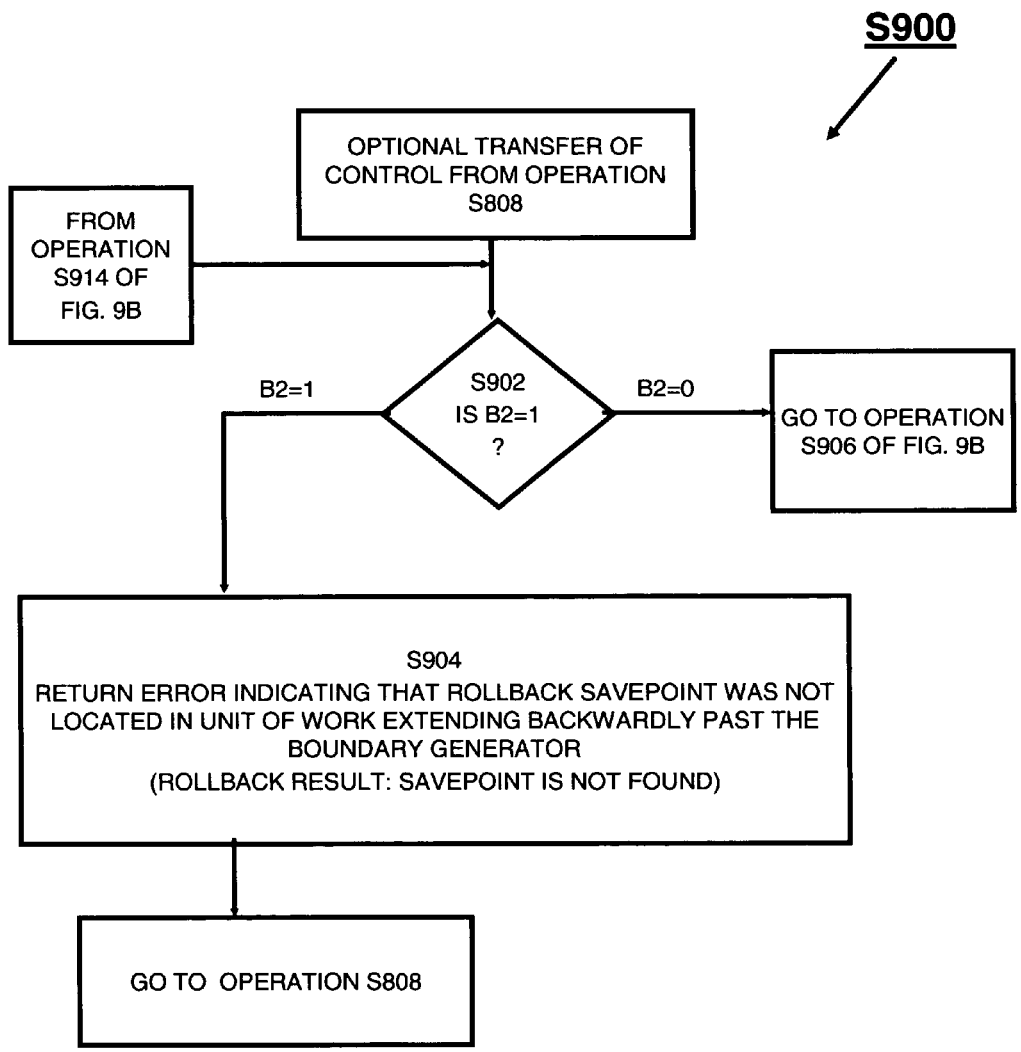
FIGS. 9A, 9B and 9C show rolling back operation of the DBTM of FIG. 1.
Figure 9B:
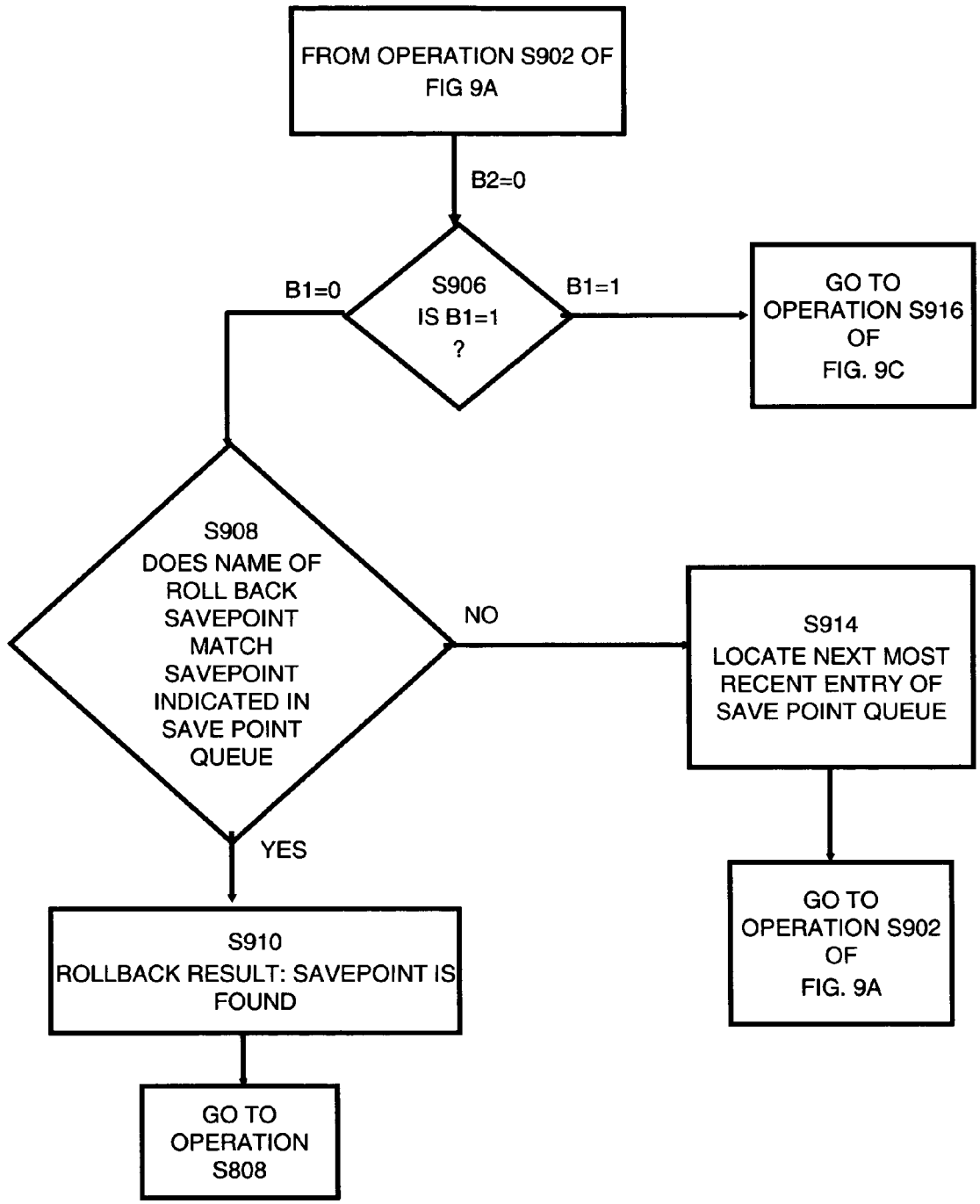
Figure 9C:
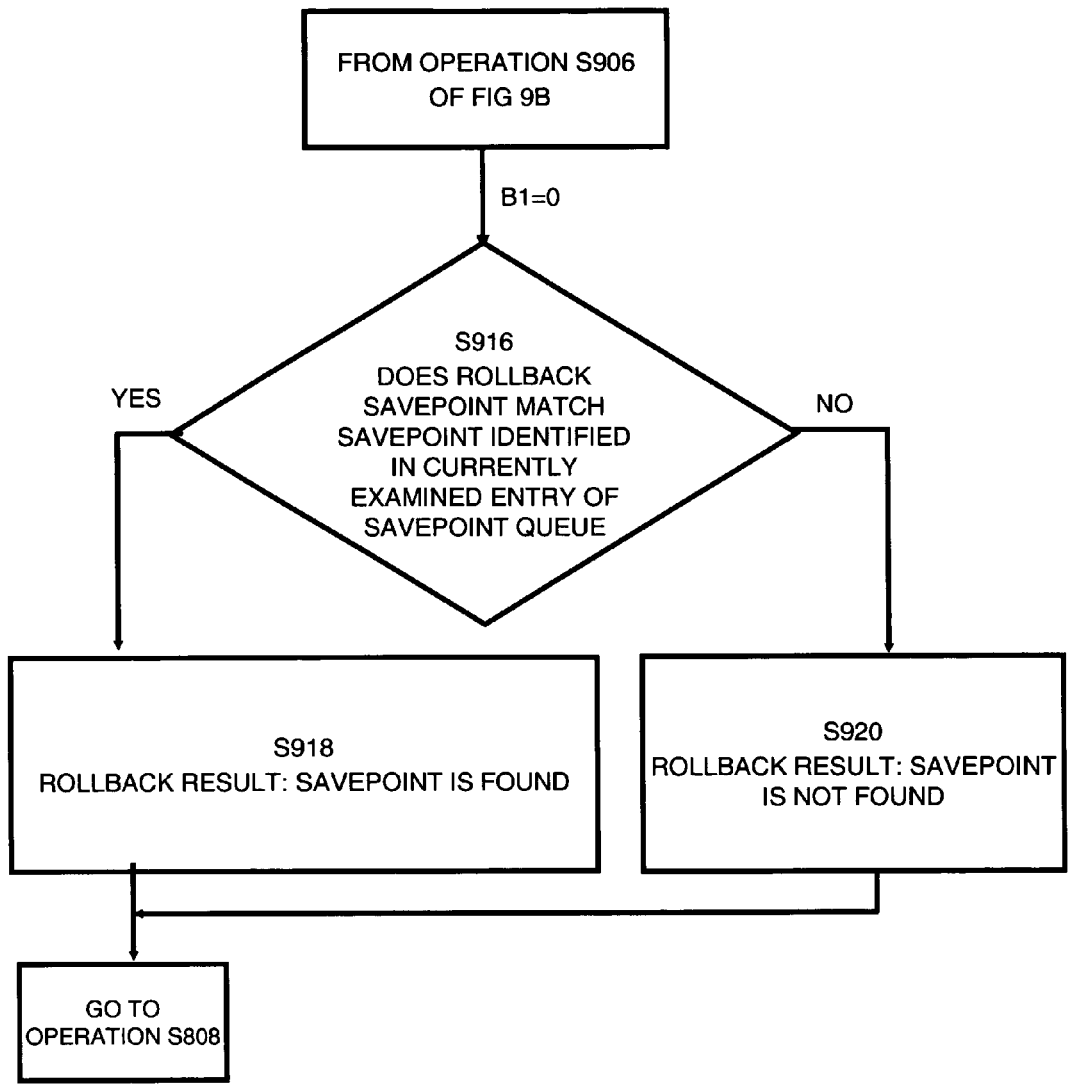

FIGS. 9A, 9B and 9C show an examination of savepoint status indicators operation S900 of the DBTM 100 of FIG. 1.

Referring now to FIG. 9A, upon optional operational transfer of control from operation S808 of FIG. 8, operation S902 directs the DBTM 100 to determine whether the relevant savepoint entry (that is, the most recent entry in the savepoint queue 102) has the savepoint status indicator B2 and determine whether B2=1. If it is determined that the indicator B2=1, control may be transferred to operation S904. If it is determined that the indicator B2=0 operation may then be transferred to operation S906 of FIG. 9B.

When B2=1 for the most recent entry of the savepoint queue 104, operation S904 directs the DBTM 100 to return an error indicator which indicates that rolling back to the rollback savepoint (in this example, SP2 was shown in the ROLLBACK statement 210 of FIG. 2) is not permitted. Roll back past the W-type boundary generator is not permitted.

Once operation S904 is completed, the DBTM 100 may transfer control back to operation S808 of FIG. 8.

Referring now to FIG. 9B, operation S906 directs the DBTM 100 examine the relevant savepoint entry (that is, the most recent entry in the savepoint queue 104) and determine if that savepoint entry is associated with an indicator B1, and whether the indicator B1=1. If it is determined that the indicator B1=1, control may be transferred to operation S916 of FIG. 9C. If it is determined that the indicator B=0, control may then be transferred to operation S908.

Operation S908 directs the DBTM 100 to determine whether the name of the savepoint identified in the ROLLBACK statement (that is, the rollback savepoint) matches the savepoint identified in the relevant entry of the savepoint queue 104 (in this case, the most recent entry). If there is no match, control may be transferred to operation S914. If there is a match, control may then be transferred to operation S910.

Operation S910 directs the DBTM 100 to roll back past the W-type boundary to the savepoint SP2. Once operation S910 is complete, control may be transferred back to operation S808 of FIG. 8.

Operation S914 directs the DBTM 100 to locate the next most recent entry of the savepoint queue 104 and then control is then transferred back to operation S902 of FIG. 9A in which the savepoint status indicators of the next most recent entry of the savepoint queue are examined (that is, the most recent entry of the savepoint queue 104 is ignored).

Referring now to FIG. 9C, operation S916 directs the DBTM 100 to determine whether the savepoint identified in the ROLLBACK statement 210 matches the savepoint identified in the currently examined savepoint queue. If yes, control is transferred to operation S918, if no control is transferred to operation S920.

Operation S919 includes rolling back to savepoint.

Operation S920 includes returning an error code to the user.

Operation S922 includes transferring control back to operation S808 of FIG. 8.

Figure 10:
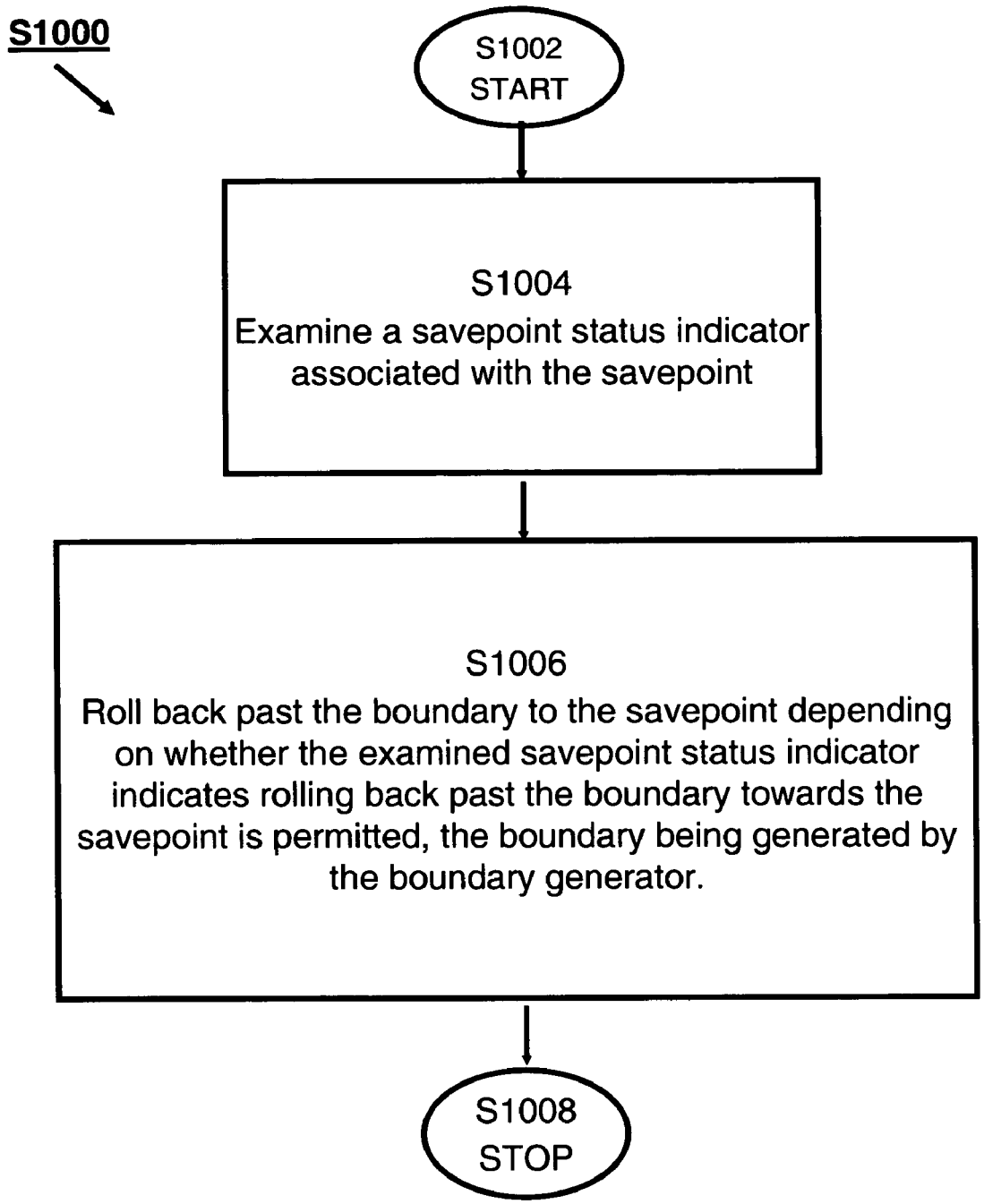
FIG. 10 shows another rolling back operation of the DBTM of FIG. 1.

FIG. 10 shows operation S1000 of the DPS 120. Operation S1000 is a data processing-implemented system for directing the DPS 120 to roll back to a savepoint located in a unit of work having boundary generator.

Operation S1002 directs the DPS 120 to begin.

Operation S1004 directs the DPS to examine a savepoint status indicator associated with the savepoint.

Operation S1006 directs the DPS 120 to roll back past the boundary to the savepoint depending on whether the examined savepoint status indicator indicates rolling back past the boundary towards the savepoint is permitted, the boundary being generated by the boundary generator.

Operation S1008 directs the DPS 120 to stop operation S1000.

The detailed description of the embodiments of the present invention does not limit the implementation of the embodiments to any particular computer programming language. The computer program product may be implemented in any computer programming language provided that the OS (Operating System) provides the facilities that may support the requirements of the computer program product. A preferred embodiment is implemented in the C or C++ computer programming language (or may be implemented in other computer programming languages in conjunction with C/C++). Any limitations presented would be a result of a particular type of operating system, computer programming language, or DPS and would not be a limitation of the embodiments described herein.

It will be appreciated that the elements described above may be adapted for specific conditions or functions. The concepts of the present invention can be further extended to a variety of other applications that are clearly within the scope of this invention. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A data processing-system implemented method for directing a data processing system to roll-back to a savepoint, having an associated savepoint status indicator, located in a unit of work having a boundary, the data processing system-implemented method comprising the steps of:

examining the savepoint status indicator; and rolling-back past the boundary to the savepoint responsive to the examined savepoint status indicator indicating rolling-back past the boundary towards the savepoint is permitted, wherein the boundary is generated by a boundary generator, and wherein a user requests insertion of the boundary generator into the unit of work, and a name of the boundary generator is inserted into a boundary generator queue.

2. The data processing-system implemented method of claim 1 further comprising the steps of: associating a savepoint status indicator manipulation rule with the boundary generator; and manipulating the savepoint status indicator according to a current status of the savepoint status indicator manipulation rule, the manipulated savepoint status indicator indicating rolling-back past the boundary is permitted.

3. The data processing system-implemented method of claim 1 further comprising the steps of: locating a savepoint identifier associated with the savepoint from a savepoint queue; and associating the savepoint status indicator with the savepoint identifier.

4. The data processing system-implemented method of claim 1 further comprising the step of: determining whether the boundary generator is a boundary generating request.

5. The data processing system-implemented method of claim 4 further comprising the step of: determining whether the boundary generating request is an Atomic Compound SQL statement.

6. The data processing system-implemented method of claim 1 further comprising the step of: determining whether the boundary generator is a boundary generating routine.

7. The data processing system-implemented method of claim 6 further comprising the step of: determining whether the boundary generating routine is one of: a stored procedure STP1 statement; a function f1 statement; and a stored procedure STP2 statement.

8. An article of manufacture for directing a data processing system to roll-back to a savepoint, having an associated savepoint status indicator, located in a unit of work having a boundary, the article of manufacture comprising:

a data processing system usable storage medium embodying one or more instructions executable by the data processing system, the one or more instructions comprising:

data processing system executable instructions for examining the savepoint status indicator; and data processing system executable instructions for rolling-back past the boundary to the savepoint responsive to the examined savepoint status indicator indicating rolling-back past the boundary towards the savepoint is permitted, wherein the boundary is generated by a boundary generator, and wherein a user requests insertion of the boundary generator into the unit of work, and a name of the boundary generator is inserted into a boundary generator queue.

9. The article of manufacture of claim 8 further comprising: data processing system executable instructions for associating a savepoint status indicator manipulation rule with the boundary generator; and data processing system executable instructions for manipulating the savepoint status indicator according to a current status of the savepoint status indicator manipulation rule, the manipulated savepoint status indicator indicating rolling-back past the boundary is permitted.

10. The article of manufacture of claim 8 further comprising: data processing system executable instructions for locating a savepoint identifier associated with the savepoint from a savepoint queue; and data processing system executable instructions for associating the savepoint status indicator with the savepoint identifier.

11. The article of manufacture of claim 8 further comprising: data processing system executable instructions for determining whether the boundary generator is a boundary generating request.

12. The article of manufacture of claim 11 further comprising: data processing system executable instructions for determining whether the boundary generating request is an Atomic Compound SQL statement.

13. The article of manufacture of claim 8 further comprising: data processing system executable instructions for determining whether the boundary generator is a boundary generating routine.

14. The article of manufacture of claim 13 further comprising: data processing system executable instructions for determining whether the boundary generating routine is one of: a stored procedure STP 1 statement; a function f1 statement; and a stored procedure STP2 statement.

15. A data processing system for rolling-back to a savepoint, having an associated savepoint status indicator, located in a unit of work having a boundary, the data processing system comprising:

an examination module stored on a memory, for examining the savepoint status indicator; and a rolling-back module stored on the memory, for rolling-back past the boundary to the savepoint responsive to the examined savepoint status indicator indicating rolling-back past the boundary towards the savepoint is permitted, wherein the boundary is generated by a boundary generator, and wherein a user requests insertion of the boundary generator into the unit of work, and a name of the boundary generator is inserted into a boundary generator queue.

16. The data processing system of claim 15 further comprising: an associating module of the memory for associating a savepoint status indicator manipulation rule with the boundary generator; and a manipulation module for manipulating the savepoint status indicator according to a current status of the savepoint status indicator manipulation rule, the manipulated savepoint status indicator indicating rolling-back past the boundary is permitted.

17. The data processing system of claim 15 further comprising: a locating module for locating a savepoint identifier associated with the savepoint from a savepoint queue; and an associating module for associating the savepoint status indicator with the savepoint identifier.

18. The data processing system of claim 15 further comprising: a determining module for determining whether the boundary generator is a boundary generating request.

19. The data processing system of claim 18 further comprising: a determining module for determining whether the boundary generating request is an Atomic Compound SQL statement.

20. The data processing system of claim 15 further comprising: a determining module for determining whether the boundary generator is a boundary generating routine.

21. The data processing system of claim 20 further comprising: a determining module for determining whether the boundary generating routine is one of: a stored procedure STP 1 statement; a function f1 statement; and a stored procedure STP2 statement.

22. The method according to claim 1, wherein the unit of work contains a plurality of database statements to be executed by a database management system against a database.

23. The method according to claim 1, wherein the savepoint is a marker within the unit of work.

24. The method according to claim 23, wherein the savepoint is set by a user.

25. The method according to claim 1, wherein the savepoint status indicator indicates whether the boundary exists in the unit of work.

26. The method according to claim 1, wherein the savepoint status indicator indicates whether the boundary generator has been processed.

* * * * *